United States Patent [19]
Feres et al.

[11] Patent Number: 5,565,282
[45] Date of Patent: Oct. 15, 1996

[54] BATTERY GANG VENT SYSTEM

[75] Inventors: Fred F. Feres, Rochester Hills, Mich.;
Gerald D. Hudack, Sinking Spring, Pa.

[73] Assignee: Exide Corporation, Reading, Pa.

[21] Appl. No.: 348,138

[22] Filed: Nov. 23, 1994

Related U.S. Application Data

[63] Continuation of Ser. No. 74,550, Jun. 11, 1993, abandoned.

[51] Int. Cl.⁶ .................................................. H01M 2/12
[52] U.S. Cl. ................. 429/84; 429/86; 429/87; 429/175
[58] Field of Search ............................ 429/84, 87, 86, 429/89, 88, 175

[56] References Cited

U.S. PATENT DOCUMENTS

| | | | |
|---|---|---|---|
| 2,364,896 | 12/1944 | Gray | 136/177 |
| 3,597,280 | 8/1968 | Hennen | 136/177 |
| 4,002,495 | 1/1977 | Hakarine | 136/177 |
| 4,168,350 | 9/1979 | Oxenreider et al. | 429/82 |
| 4,306,002 | 12/1981 | Heiser et al. | 429/82 |
| 4,348,466 | 9/1982 | Elehew et al. | |
| 4,778,735 | 10/1988 | Shestok et al. | |
| 4,851,305 | 7/1989 | Kump et al. | 429/89 X |
| 4,916,034 | 4/1990 | Hulsebus et al. | 429/86 |
| 5,132,175 | 7/1992 | Mrotek et al. | 429/86 |

FOREIGN PATENT DOCUMENTS

| | | |
|---|---|---|
| 1143786 | 3/1983 | Canada . |
| 2472274 | 6/1981 | France . |
| 2536213 | 5/1984 | France . |

*Primary Examiner*—John S. Maples
*Attorney, Agent, or Firm*—Nixon & Vanderhye P.C.

[57] ABSTRACT

A multiple vent plug assembly for vent ports of an electrical storage battery, the assembly includes a gang vent insert having a base wall and an upstanding peripheral rim defining a pair of side walls and a pair of end walls; an overcap including an inner rib for engagement with the upstanding peripheral rim of the gang vent insert; the insert including first and second parallel partitions extending between the pair of side walls to thereby divide the insert into three vent chambers including end chambers on either side of a center chamber, each chamber having a hollow vent barrel extending downwardly from the base wall and terminating at a drain hole. Third and fourth partitions extend partially between the pair of side walls and a fifth partition extends between and perpendicular to the third and fourth partitions to create, in cooperation with a portion of one of the side walls, a frit area for supporting a flame arrestor of glass frit material, the frit area having a slot therein which opens to atmosphere. The first, second, third and fourth partitions are formed with passageway openings arranged to permit air at atmospheric pressure to enter the center chamber from the end chambers and from the frit area, to thereby create an air lock preventing battery electrolyte from escaping through the drain holes and the frit area vent aperture in the event the battery is tilted to a position where battery electrolyte is at a level above the battery vent ports.

11 Claims, 2 Drawing Sheets

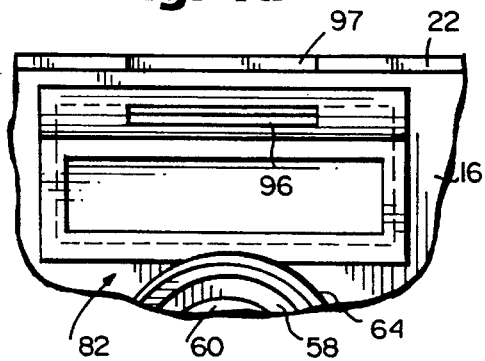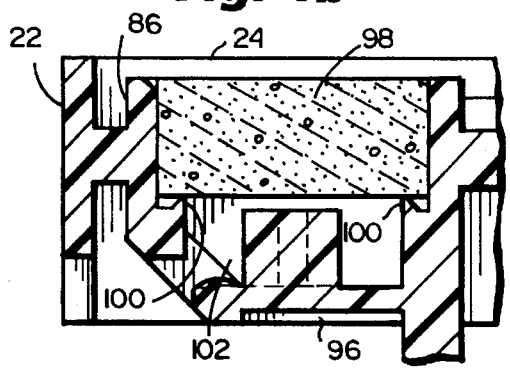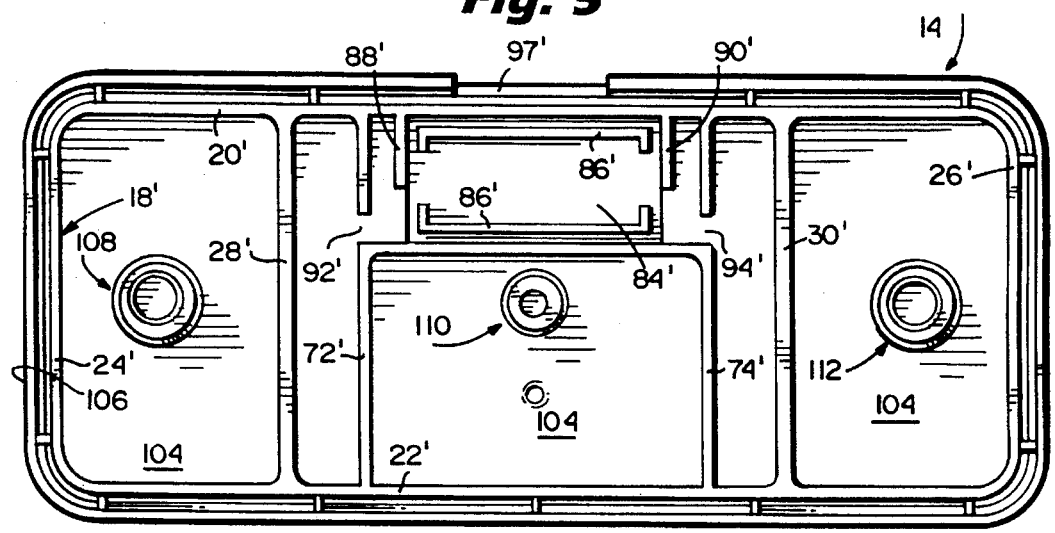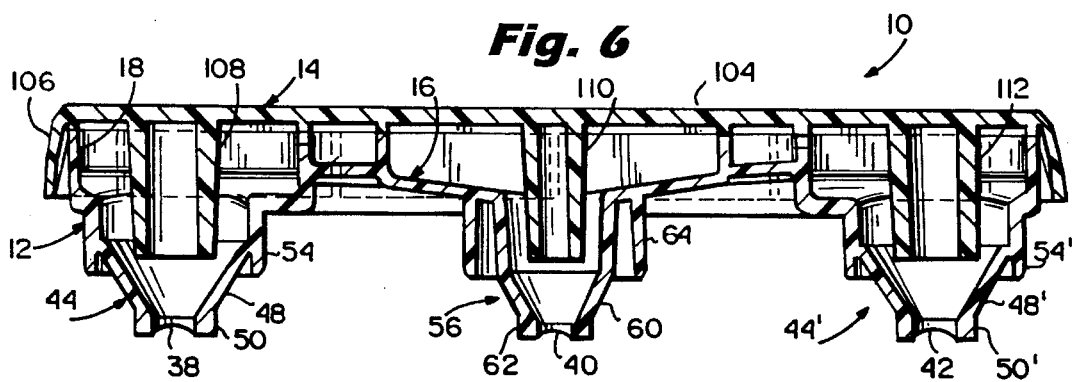

5,565,282

BATTERY GANG VENT SYSTEM

This is a continuation of application Ser. No. 08/074,550, filed Jun. 11, 1993, now abandoned.

This invention relates to venting systems used in low maintenance batteries, and in maintenance-free batteries where the need to periodically replenish the loss of water is not required. The invention relates specifically to a vent system which provides the absolute minimum loss of electrolyte under a wide range of conditions (including a severely tilted condition) to enhance the life and operation of the battery.

BACKGROUND AND SUMMARY OF THE INVENTION

Maintenance-free batteries have been known for some time. The term "maintenance-free" denotes a battery in which there is no need for the addition of water throughout the useful life of the battery. Thus, venting systems for maintenance-free batteries do not require the removal of the vent system for access to each cell. Because of the diversity of applications, however, low maintenance batteries (requiring minimal periodic addition of water) are still widely in use, and are well known for reliability under a wide range of conditions of abusive over-discharge, temperature variations, etc.

In all cases, the vent system must provide the absolute minimum loss of electrolyte under a wide range of conditions to enhance the life and operation of the battery. Even during the normal operation of a battery, water is electrolyzed into hydrogen and oxygen while temperature excursions produce water vapor, both of which will tend to be lost through the venting system. A well designed vent network must prevent this loss by capturing, condensing and draining all fluids back into the cells. A battery designed for starting, lighting, and ignition (SLI) will experience a variety of rough handling during its manufacture, storage and distribution including an occasional accidental tilting of the battery on its side, a variety of angled inclines once the battery is in vehicle, as well as normal vibrations. A well designed vent system must prevent or minimize spilling, and also safeguard the battery against external ignition sources.

Traditionally, vents have been designed for the most common location of vent ports, i.e., centered on the battery cover. Gang vents designed to fit on batteries of this design seldom experience pressurized electrolyte reaching the openings on each gang vent barrel while tilting, e.g., 45% to either side (as opposed to either end) of the battery. Recently, however, requirements to move the cell ports asymmetrically on the battery casing has demanded a different approach to the vent design.

Where the cell ports are located relatively close to one side of the top wall of the battery casing, tilting of the battery in a direction toward that one side may force liquid up into one or more vent barrels, amplified by the internal positive pressure of gases generated during charging. Tilting of the battery toward the opposite side, however, will not result in a loss of electrolyte since the acid level will remain below the cell port or vent orifices. This invention relates to a unique vent system which will prevent the loss of electrolyte even when the battery is temporarily tilted completely onto the side closest the vent ports and with the acid level above the vent orifices.

Thus, in accordance with an exemplary embodiment of the invention, flooding and spewing of electrolyte through the vents is prevented by utilizing the internal pressure of the electrolyte against the underside of the vents to prevent flooding, while any significant amount of fluid that may have entered into the vents will be contained and later quickly drained back into the cells, once the battery is set upright. This is accomplished by making the vent barrels (three, in the exemplary embodiment) slightly different in internal cross section, such that electrolyte enters through the outer barrels first. This arrangement allows a minute amount of electrolyte into the outer chambers of the vent cap which will quickly produce air pressure which is transmitted into the center chamber causing the fluids to become air locked, thus preventing the ingestion of additional liquid and stopping the further flow of electrolyte toward the vent frit area.

Additional improvements have been incorporated by speeding the drainage of ingested fluids back into the cells by providing sloped surfaces inside the vent cap insert, and designing barrel drippers to protrude below the barrel line. This is significant in that liquid that "hangs" in the barrel area can otherwise be pushed upwards by the gases generated during charging.

In accordance with its broader aspects, the present invention relates to a multiple vent plug assembly for a corresponding number of vent ports in a vehicle electrical storage battery, the vent plug assembly comprising a gang vent insert formed with three chambers, each chamber having substantially aligned vent barrels and associated drain holes; a frit area enclosing porous frit material, the frit area open to atmosphere; an overcap secured to said gang vent insert; and means provided in the gang vent insert and the overcap for creating an air lock within the multiple vent plug assembly and for thus preventing spillage of battery electrolyte to atmosphere through the frit area.

In another aspect, the invention relates to a multiple vent plug assembly for vent ports of an electrical storage battery, the assembly comprising a gang vent insert having a base wall and an upstanding peripheral rim defining a pair of side walls and a pair of end walls; an overcap including an inner rib adapted for engagement with said upstanding peripheral rim of the gang vent insert; the insert including first and second parallel partitions extending between the pair of side walls to thereby divide the insert into three vent chambers including end chambers on either side of a center chamber, each chamber having a hollow vent barrel extending downwardly from said base wall and terminating at a drain hole; third and fourth partitions extending partially between the pair of side walls and a fifth partition extending between and perpendicular to the third and fourth partitions to create, in cooperation with a portion of one of the side walls, a frit area for supporting a flame arrestor comprising a glass frit composition; the frit area having a slot therein which, when the assembly is in place on the storage battery, opens to atmosphere; and wherein the first, second, third and fourth partitions are formed with passageway openings arranged to permit air at atmospheric pressure to enter the center chamber from the end chambers and from the frit area, to thereby create an air lock preventing battery electrolyte from escaping through the drain holes and the frit area vent aperture in the event the battery is tilted to a position where battery electrolyte is at a level above the battery vent ports.

In still another aspect, the invention relates to a gang vent insert for a multiple vent plug assembly utilized to cover a plurality of vent ports in a vehicle electrical storage battery cover, the gang vent insert comprising a substantially rectangular member having a base and an upstanding peripheral edge including a pair of opposed side edges and a pair of opposed end edges, and a pair of laterally spaced first and second partitions extending between said opposite side edges of the upstanding peripheral edge to thereby divide the insert into three chambers including a pair of end chambers on either side of a center chamber; each chamber provided with a substantially cylindrical vent barrel extending downwardly from the base, the vent barrel including a funnel portion terminating at a drain hole, the drain holes in the end chambers having first diameters larger than a second diameter of the drain hole in the center chamber, all of the drain holes having a common centerline extending perpendicular to the laterally spaced first and second partitions; and wherein each of the first and second partitions is formed with a notch located on the other side of the centerline, and offset from the drain holes.

The details of the invention will become apparent from the description which follows.

BRIEF DESCRIPTION OF THE DRAWINGS

FIG. 4A is a partial plan taken along line 4A—4A of FIG. 3;

FIG. 4B is a partial section view taken along the line 4B—4B of FIG. 1;

FIG. 5 is a bottom plan of a gang vent cover for use with the insert illustrated in FIG. 1; and FIG. 6 is a cross sectional view illustrating the gang vent insert and gang vent cover in assembled relationship in accordance with the invention.

DETAILED DESCRIPTION OF THE DRAWINGS

The vent cap assembly 10 of this invention includes two components, the gang vent insert (FIG. 1) 12 and the overcap or cover 14 (FIG. 5), which are shown together in assembled relationship in FIG. 6.

Figure 1:
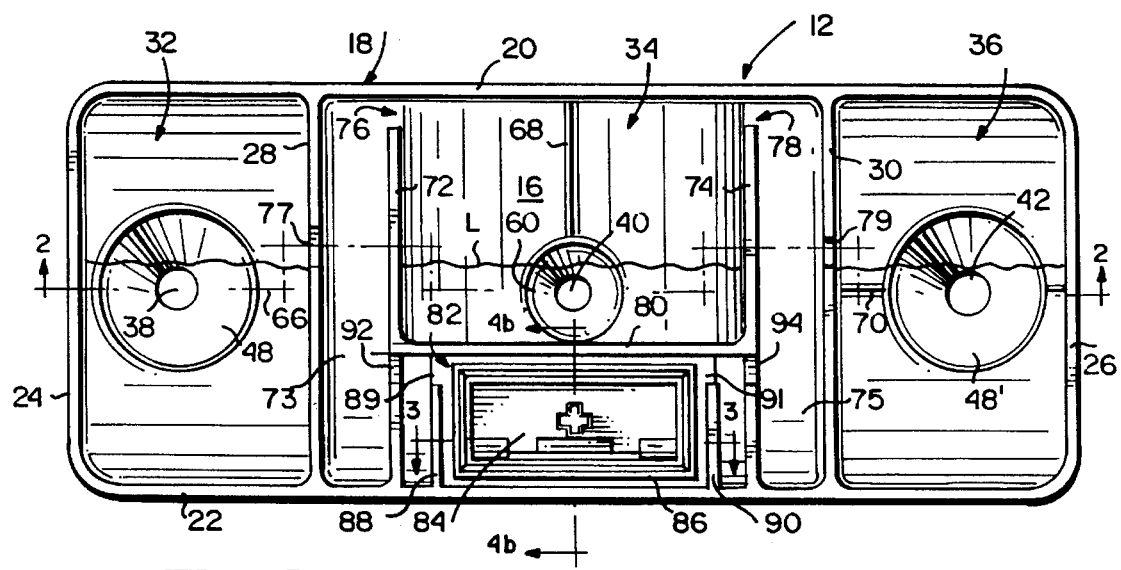
FIG. 1 is a plan view of a gang bent insert in accordance with an exemplary embodiment of the invention.
Figure 2:
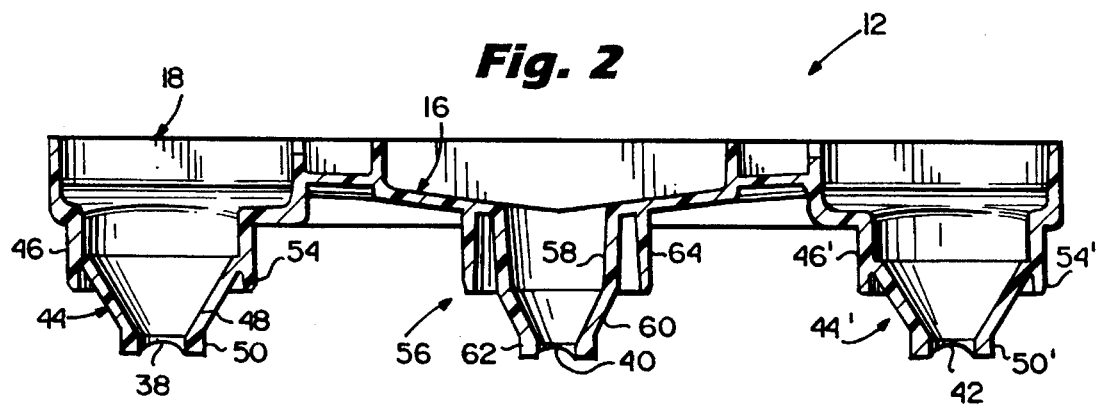
FIG. 2 is a cross sectional view taken along line 2—2 of FIG. 1.
Figure 2A:
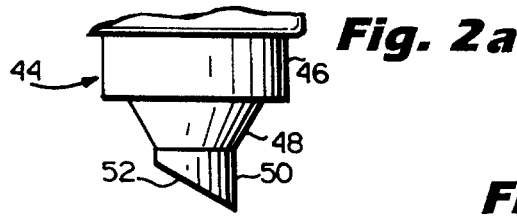
FIG. 2A is a partial cross sectional view taken along the line 2A—2A of FIG. 1.
Figure 3:
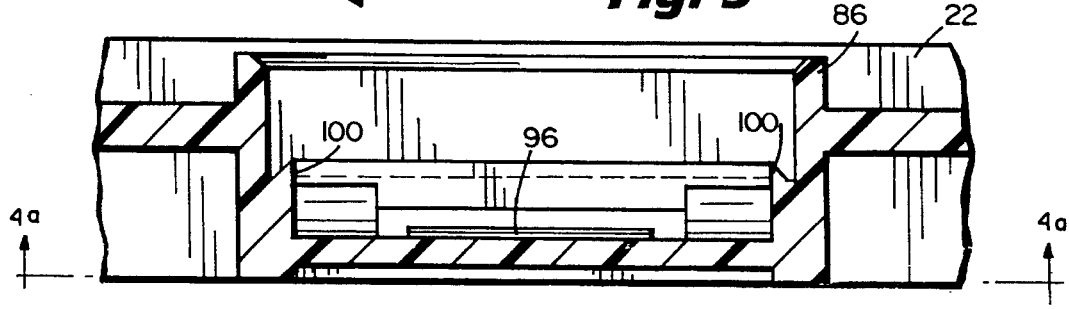
FIG. 3 is a sectional elevation taken along line 3—3 of FIG. 1.

With specific reference to FIGS. 1–3, the gang vent insert 12 is a one-piece member of plastic construction, formed with a generally horizontal wall 16 surrounded by an upstanding peripheral rim 18 including side walls 20, 22 and end walls 24, 26 ("side" and "end" are terms used merely for convenient reference). A pair of laterally spaced interior partitions 28, 30 serve to divide the insert effectively into three vent chambers 32, 34 and 36. Each chamber 32, 34 and 36 is provided with its own drain hole 38, 40 and 42, respectively. Drain hole 38 is located at the lower end of a drain barrel 44 defined by a cylindrical wall portion 46 and a conical funnel portion 48. The hole 38 is formed in a cylindrical extension 50 at the bottom of the funnel portion 38 which is bevelled at its free edge 52, as best seen in FIG. 2a. The exterior of the funnel portion 48 is surrounded at its upper end by a downwardly projecting tip or rim 54 (which, in reality, is simply an extension of the cylindrical wall portion 46). The drain hole 42 on the opposite side of the vent cap insert 12 is identical to drain hole 38. Thus, similar reference numerals, but with a "prime" designation added, are used to denote, for example, the associated barrel 44' and components thereof.

The center hole 40 is located at the lower end of a drain barrel 56, defined by a cylindrical wall portion 58 and a conical funnel portion 60. The hole 40 is formed in a cylindrical extension 62 at the bottom of the funnel portion 60, the free edge of which is bevelled in the same manner as extension 50 described above. The exterior of the cylindrical wall portion 58 and funnel portion 60 is surrounded by a downwardly projecting, annular skirt 64. It should be noted that the respective diameters of the center hole 40 and the cylindrical wall portion 58 are less than the corresponding diameters of holes 38, 42 and cylindrical wall portions 46, for reasons provided below.

The floor 16 in each chamber 32, 34 and 36 is slightly inclined toward respective drain holes 38, 40 and 42, so that when the insert 12 is in its normal upright (horizontal) position as shown in FIG. 2, any electrolyte present within the insert chambers 32, 34 and 36 will drain quickly into the respective drain barrels 44, 56 and 44' and back into the battery. These inclined surfaces are indicated by crease lines 66, 68 and 70 in FIG. 1 (the incline is also readily apparent in the center chamber 34 in FIG. 2). It will be appreciated from the orientation of crease lines 66, 68 and 70 that the directions of taper or incline in center chamber 34 are perpendicular to the directions of taper or incline in outside chambers 32 and 36.

The center chamber 34 is further defined by a pair of partitions 72, 74 extending from wall 22 toward wall 20 on either side of hole 40, but closer to (and parallel to) the partitions 28 and 30. These partitions 72, 74 terminate short of wall 20 as best seen in FIG. 1, and create a pair of passageways 73, 75 which run transverse to the elongated direction of the insert 12, and which connect to the center chamber 34 via openings 76, 78. Partitions 28 and 30 are each formed with a notch 77, 79, respectively, located in offset relationship to the center hole 40 (as well as outside holes 38 and 42). In this way, outside chambers 32, 36 are placed in fluid communication with the center chamber 34 by means of notches 77, 79 and passageways 73, 75 and openings 76, 78, respectively.

The center chamber 34 is also shortened in the side-to-side dimension by the partition 80 extending between partitions 72, 74 in a direction parallel to side walls 20, 22. This structure creates a frit area 82 including a rectangular recess 84 surrounded by a similarly shaped upstanding peripheral wall 86. Adjacent the recess 84, there are formed on either side thereof a pair of walls 88, 90 extending from wall 22 but terminating short of wall 80, thereby creating openings 89, 91. At the same time, partitions 72 and 74 are notched as at 92, 94 (on the frit area side of partition 80) thus providing fluid communication between the frit area 82 and center chamber 34 via openings 89, 91, notches 92, 94, passageways 73, 75 and openings 76, 78.

The recess 84 is formed with an elongated slot 96 in the base thereof, as best seen in FIGS. 3, 4a and 4b. By reason of an adjacent slot or cut-out 97 (FIG. 4a) in the side wall 22, it will be appreciated that slot 96 and thus frit 98 are exposed to atmospheric pressure. A flame arrestor in the form of glass frit material 98 (omitted for the sake of clarity in FIGS. 1 and 3) is located within the recess 84, supported by projections 100 (FIG. 4b), so as to create an interior space 102 within the recess 94, between the frit 98 and the slot 96.

Turning now to FIGS. 5 and 6, the overcap 14 has a smooth top wall 104 surrounded by a downwardly extending peripheral rim or skirt 106. The interior surface of the top wall 104 is formed with a pattern of ribs corresponding generally to the walls and partitions of the insert 14. An interior peripheral rim 18' extends in a closed loop just inside the skirt 106 and is dimensioned to seat on the corresponding rim 18 of the insert. These corresponding ribs on the interior of the overcap 14 and corresponding notches or openings are denoted by the same numerals used to denote the various corresponding partitions in the insert 16, but with a "prime" designation added. When the insert 16 is in place within the overcap 14, the similarly numbered ribs and partitions are in flush seating engagement as best seen in FIG. 6. Ribs 72' and 74' are provided with notches or discontinuities 92' and 94' which cooperate with notches 92, 94 to further define the passageways out of the frit area 82.

The overcap 14 is also formed on the interior side with open-ended cylindrical tubes or sleeves 108, 110 and 112 which fit concentrically within the drain barrels 44, 56 and 44', respectively, as best seen in FIG. 6. Sleeves 108 and 112 extends into barrels 44 and 44' and terminate just inside the conical portions 48, 48' thereof, whereas sleeve 110 extends into barrel 56 and terminates near the lower end of the cylindrical portion 58. These sleeves serve as splash guards and facilitate return of electrolyte from the insert/overcap assembly back into the battery cells.

The insert 14 and overcap 16 may be heat sealed together about the abutting edges thereof, and in the location of an upstanding tab 114 formed on the overcap.

In use, the above described vent plug assembly 10 will be frictionally attached to the storage battery top plate or cover, to thereby close off a set of three vent ports (not shown). As also described above, the vent ports will be located asymmetrically with respect to the battery cover, i.e., closer to one side wall than the other. Because of this arrangement, tilting of the battery to one side where the asymmetrical vent ports are at their highest level will pose no spillage problem because the electrolyte within the battery will be below the vent ports.

However, when the battery is tilted to the other side, with the vent ports at their lowest level, and with the frit side of the vent cap/insert down, the level of electrolyte within the battery will be significantly above the vent ports and it is this situation which the vent cap assembly of this invention is designed to address. This condition is simulated in FIG. 1 where gang vent insert 12 (and battery as a whole) can be imagined to be tilted 90° and resting on its side, with the frit area 82 closest to the floor or other supporting surface. In this condition, electrolyte will start to fill the three chambers 32, 34 and 36 through the teardrop dripper drain holes 38, 40, 42 and associated vent barrels 44, 56 and 44'. Because of the relatively larger cross-sectional areas of barrels 44 and 44', liquid electrolyte will enter the outside chambers 32 and 36 first. As a result, air pressure will be produced which is transmitted to the center chamber 34 via notches 77, 79 and the openings 76, 78 created by the shortened partitions 72, 74. As the chambers 32, 36 fill with electrolyte, an opposing pressure will be exerted within the chambers as a result of air at atmospheric pressure entering through the frit area 82 via notches 97', 97 and slot 96, and flowing through passageway openings 92, 94, passageways 73, 75 into the end chambers 32, 34 via passageway notches 77, 79 and into center chambers 34 via openings 76, 78. This will result in a "cancellation" of pressure since each battery cell is competing to drain against the single port of exit, i.e., the frit area vent aperture 96. In fact, the porous frit area, packed with porous frit material 98, will actually help in providing a back pressure against air trying to escape from the battery. In this regard, the porous frit material or flame arrester is designed to allow no more than 12,000 ml/min at an air pressure of 10 inches of water.

With reference again to FIG. 1, it will be appreciated that the air at atmospheric pressure within the chambers 32, 34 and 36 will hold the level of electrolyte to the level indicated by L in FIG. 1 and, once the drain holes 38, 40 and 42 are blocked with electrolyte, no more fluid will exit the battery, especially due to the fact that the intercell passage openings 77, 79 have been designed to be offset from the drain holes 38, 40 and 42.

When the battery has been moved back to its upright position, the electrolyte within the chambers 32, 34 and 36 (and any electrolyte which may have been trapped in sleeves 108, 100 and 112), will drain back into the battery cells via the drain barrels 44, 56 and 44' quickly, with the assistance of the inclined surfaces in the floor or base wall 16.

With the above arrangement, spilling is prevented under conditions of 45° continuous tilt and even of 90° temporary tilt in both directions.

It will be appreciated that the vent design described above is applicable to any size battery, and can be placed essentially anywhere on the battery cover provided the venting frit vents away from the centerline of the battery.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multiple vent plug assembly for vent ports of an electrical storage battery, the assembly comprising:

a gang vent insert having a base wall and an upstanding peripheral rim defining a pair of side walls and a pair of end walls;

an overcap including an inner rib in engagement with said upstanding peripheral rim of said gang vent insert;

said insert including first and second parallel partitions extending between said pair of side walls to thereby divide said insert into three vent chambers including end chambers on either side of a center chamber, each chamber having a hollow vent barrel extending downwardly from said base wall and terminating at a drain hole;

third and fourth partitions extending partially between said pair of side walls and a fifth partition extending between and perpendicular to said third and fourth partitions to create, in cooperation with a portion of one of said side walls, a frit area for supporting a flame arrestor comprising a glass frit composition; said frit area having a slot therein which, when said assembly is in place on said storage battery, opens to atmosphere; and wherein said first, second, third and fourth partitions are formed with passageway openings arranged to permit air to enter said center chamber from said end chamber and from said frit area, to thereby create an air lock preventing battery electrolyte from escaping through said drain holes and said frit area vent aperture in the event the battery is tilted to a position where battery electrolyte is at a level above said battery vent ports; and further wherein the drain hole in said center chamber has a diameter less than corresponding diameters of the drain holes in said end chambers.

2. A gang vent insert for a multiple vent plug assembly utilized to cover a plurality of vent ports in a vehicle electrical storage battery cover, the gang vent insert comprising:

a substantially rectangular member having a base and an upstanding peripheral edge including a pair of opposed side edges and a pair of opposed end edges, and a pair of laterally spaced first and second partitions extending between said opposite side edges of said upstanding peripheral edge to thereby divide the insert into three chambers including a pair of end chambers on either side of a center chamber; each chamber provided with a substantially cylindrical vent barrel extending downwardly from said base, said vent barrel including a funnel portion terminating at a drain hole, the drain holes in said end chambers having first diameters larger than a second diameter of the drain hole in said center chamber, all of said drain holes having a common centerline extending perpendicular to said laterally spaced first and second partitions; and wherein each of said first and second partitions is formed with a notch located on one side of said centerline, and offset from said drain holes.

3. The gang vent insert of claim 2 and further comprising third and fourth partitions extending parallel to said first and second partitions and located between said first and second partitions, respectively, and said center chamber; and a fifth partition extending between said third and fourth partition, substantially parallel to but spaced from said centerline such that a frit area is defined on another side of said centerline by said fifth partition, portions of said third and fourth partitions and a portion of one of said side edges.

4. The gang vent insert of claim 3 wherein each of said third and fourth partitions is formed to provide an opening on said other side of the centerline and offset from said drain holes.

5. The gang vent insert of claim 4 wherein each of said third and fourth partitions is formed with a notch on said one side of the centerline, between the fifth partition and said one of said side edges.

6. The gang vent insert of claim 5 wherein said frit area is provided with a slot extending through the base of the insert.

7. The gang vent insert of claim 6 wherein said frit area is formed with a substantially rectangular recess formed in said base, and said slot is formed in a lower portion of said recess.

8. The gang vent insert of claim 7 wherein porous frit material is supported within said recess but spaced from said slot.

9. The gang vent insert of claim 8 wherein said frit area is provided with sixth and seventh partitions located on either side of said recess, between said recess and said third and fourth partitions, and extending from said one of said side edges toward said fifth partition, but terminating short of said fifth partition.

10. A multiple vent plug assembly for a corresponding number of vent ports in a vehicle electrical storage battery, the vent plug assembly comprising:

a gang vent insert formed with three chambers, each chamber having substantially aligned vent barrels and associated drain holes;

a frit area enclosing porous frit material, said frit area open to atmosphere;

an overcap secured to said gang vent insert; and wherein said three chambers include a pair of end chambers on either side of a center chamber and wherein the drain holes in the end chambers have diameters larger than the diameter of the drain hole in the center chamber.

11. A multiple vent plug assembly for a corresponding number of vent ports in a vehicle electrical storage battery, the vent plug assembly comprising:

a gang vent insert formed with three chambers, each chamber having substantially aligned vent barrels and associated drain holes, said three chambers including a pair of end chambers on either side of a center chamber and wherein the drain holes in the end chambers have diameters larger than the diameter of the drain hole in the center chamber;

a frit area enclosing porous frit material, said frit area open to atmosphere;

an overcap secured to said gang vent insert; and means provided in said gang vent insert and said overcap for creating an air lock within said multiple vent plug assembly and for thus preventing spillage of battery electrolyte to atmosphere through said frit area even when said battery is tilted on one of said sides closest to said frit area; wherein said means includes air passageways linking said three chambers, said passageways defining a path located to one side of a centerline extending through said drain holes, and wherein said frit area is located on an opposite side of said centerline; and wherein said means includes additional air passageways linking said frit area with said three chambers.

* * * * *